United States Patent
Lee

(10) Patent No.: US 10,935,375 B2
(45) Date of Patent: Mar. 2, 2021

(54) PORTABLE 3D DOCUMENT SCANNING DEVICE AND METHOD

(71) Applicant: KALLION, INC., Daejeon (KR)

(72) Inventor: Chui Hee Lee, Daejeon (KR)

(73) Assignee: KALLION, INC., Daejeon (KR)

( * ) Notice: Subject to any disclaimer, the term of this patent is extended or adjusted under 35 U.S.C. 154(b) by 163 days.

(21) Appl. No.: 16/301,113

(22) PCT Filed: Apr. 5, 2017

(86) PCT No.: PCT/KR2017/003714
§ 371 (c)(1),
(2) Date: Feb. 15, 2019

(87) PCT Pub. No.: WO2017/195985
PCT Pub. Date: Nov. 16, 2017

(65) Prior Publication Data
US 2019/0170508 A1    Jun. 6, 2019

(30) Foreign Application Priority Data

May 13, 2016    (KR) .................. 10-2016-0059037

(51) Int. Cl.
*G06K 9/00* (2006.01)
*G01B 11/25* (2006.01)
(Continued)

(52) U.S. Cl.
CPC ........ *G01B 11/2518* (2013.01); *G01B 11/028* (2013.01); *G01B 11/2509* (2013.01);
(Continued)

(58) Field of Classification Search
CPC .............. G01B 11/2518; G01B 11/306; G01B 11/2513; G01B 11/028; H04N 1/00;
(Continued)

(56) References Cited

U.S. PATENT DOCUMENTS 5,084,611 A * 1/1992 Okisu .................... H04N 1/195
250/208.1
5,377,019 A * 12/1994 Okisu ................ H04N 1/00795
358/448
(Continued)

FOREIGN PATENT DOCUMENTS

KR    100470922    3/2005
KR    100585270    5/2006
(Continued)

OTHER PUBLICATIONS

International Patent Application No. PCT/KR2017/003714, English translation of Written Opinion dated Jul. 12, 2017.
(Continued)

*Primary Examiner* — Samir A Ahmed
(74) *Attorney, Agent, or Firm* — Leber IP Law; David C. Robertson

(57) ABSTRACT

Disclosed is a portable 3-dimensional (3D) document scanning device and method. The portable 3D document scanning device includes a projector projecting light of a predetermined pattern onto a document, a 3D scanning camera capturing a pattern of the light projected onto the document and the document, and a control unit estimating a size of the captured document based on image data of the captured document, estimating a shape of the captured document based on the pattern of the projected light and the captured pattern of the light, and correcting the image data of the captured document based on the estimated size and the estimated shape.

9 Claims, 7 Drawing Sheets

(51) Int. Cl.
*H04N 1/00* (2006.01)
*H04N 13/20* (2018.01)
*G01B 11/30* (2006.01)
*G01B 11/02* (2006.01)
*G06T 7/55* (2017.01)

(52) U.S. Cl.
CPC ........ *G01B 11/2513* (2013.01); *G01B 11/306* (2013.01); *G06T 7/55* (2017.01); *H04N 1/00* (2013.01); *H04N 13/20* (2018.05)

(58) Field of Classification Search
CPC .... H04N 13/20; H04N 1/00827; H04N 5/232; H04N 13/204; H04N 13/246; H04N 13/254; G06T 7/55; G06T 3/60
See application file for complete search history.

(56) References Cited

U.S. PATENT DOCUMENTS

| | | | | |
|---|---|---|---|---|
| 5,497,236 | A * | 3/1996 | Wolff | G06T 3/0031 358/296 |
| 5,760,925 | A * | 6/1998 | Saund | G06T 3/0031 358/497 |
| 5,835,241 | A * | 11/1998 | Saund | H04N 1/047 358/488 |
| 6,549,288 | B1 * | 4/2003 | Migdal | G01B 11/25 356/601 |
| 6,954,290 | B1 * | 10/2005 | Braudaway | G06K 9/3283 358/3.26 |
| 2002/0113946 | A1 * | 8/2002 | Kitaguchi | G03B 21/26 353/28 |
| 2005/0024508 | A1 * | 2/2005 | Okisu | H04N 5/232 348/254 |
| 2006/0164526 | A1 * | 7/2006 | Suzuki | H04N 5/232 348/239 |
| 2007/0177160 | A1 * | 8/2007 | Sasaki | G06T 7/50 356/603 |
| 2011/0043873 | A1 * | 2/2011 | Maruo | H04N 1/00814 358/475 |
| 2013/0082106 | A1 * | 4/2013 | Hoshina | H04N 1/107 235/455 |
| 2013/0155435 | A1 * | 6/2013 | Ma | H04N 1/00596 358/1.13 |
| 2013/0242054 | A1 * | 9/2013 | Chiu | H04N 13/10 348/46 |
| 2013/0314388 | A1 * | 11/2013 | Oda | G03B 21/53 345/207 |
| 2014/0072201 | A1 * | 3/2014 | Tilt | G06T 1/0007 382/140 |
| 2015/0207941 | A1 * | 7/2015 | Koda | H04N 1/00702 358/3.26 |
| 2015/0304617 | A1 * | 10/2015 | Chang | H04N 13/254 348/189 |

FOREIGN PATENT DOCUMENTS

| | | |
|---|---|---|
| KR | 100914961 | 9/2009 |
| KR | 1020130091090 | 8/2013 |
| KR | 1020150120066 | 10/2015 |

OTHER PUBLICATIONS

International Patent Application No. PCT/KR2017/003714, English translation of International Search Report dated Jul. 12, 2017.

* cited by examiner (a)            (b)

PORTABLE 3D DOCUMENT SCANNING DEVICE AND METHOD

TECHNICAL FIELD

The present disclosure relates to a portable three-dimensional (3D) document scanning technology, and more particularly, to a portable 3D document scanning device and method that are capable of easily scanning a document in 3 dimensions by a projector and a 3D scanning camera.

BACKGROUND ART

A 3D scanning device is an optical device that obtains 3D shape and color information of an object and is used in a wide range of fields such as commercial, architectural, medical, industrial, academic, and cultural fields. The 3D scanning device may be implemented in various methods such as laser triangulation, structured light projection, Time of Flight (TOF), and the like and stores the obtained 3D shape information of the object in a 3D file format capable of being used in a computer.

The 3D scanning technology obtains shape information of an object to store the shape information as a computer model, and is increasingly demanded in areas such as the Robot navigation, the defection inspection of parts, reverse engineering, Human Computer Interaction (HCl), and cultural property restoration.

DETAILED DESCRIPTION OF THE INVENTION

Technical Problem

Embodiments of the present disclosure provide a portable 3D document scanning device and method that are capable of easily scanning a document in 3 dimensions by a projector and a 3D scanning camera.

In particular, embodiments of the present disclosure provide a portable 3D document scanning device and method that may capture a pattern projected onto a document to be captured by the 3D scanning camera, and the document, may estimate at least one or more of the size, the rotation degree, a capture angle, a shape, and an Spatially-varying Illuminance values of a document based on the captured pattern and the captured document, may correct image data associated with the captured document based on the estimated information, and thus may easily scan the document in 3 dimensions.

Technical Solution

According to an embodiment of the present disclosure, a portable 3-dimensional (3D) document scanning device includes a projector projecting light of a predetermined pattern onto a document, a 3D scanning camera capturing a pattern of the light projected onto the document and the document, and a control unit estimating a size of the captured document based on image data of the captured document, estimating a shape of the captured document based on the pattern of the projected light and the captured pattern of the light, and correcting the image data of the captured document based on the estimated size and the estimated shape.

The control unit is configured to detect at least one edge of the captured document to estimate the size and a rotation degree of the captured document, to compare the pattern of the projected light with the captured pattern of the light to estimate the shape of the captured document including bending or a wrinkle of the document, and to correct the image data of the captured document based on the estimated information.

The control unit is configured to correct the image data of the captured document based on the estimated information so as to change the captured document in a predetermined specific size and a predetermined specific shape.

The control unit is configured to detect whether a predetermined object is included in the captured document and, when the object is detected, to remove the detected object from the captured document.

The control unit is configured to estimate illuminance values for each area of the captured document based on the image data of the captured document, the pattern of the projected light and the captured pattern of the light, a material of the captured document, and an angle of the projected light and to set the estimated illuminance values to a predetermined reference illuminance value with respect to each area of the captured document to correct the image data of the captured document.

The projector projects a plurality of structured lights having predetermined different patterns onto the document, and the 3D scanning camera captures a pattern of each of the plurality of structured lights projected onto the document.

According to an embodiment of the present disclosure, a portable 3D document scanning method includes projecting light of a predetermined pattern onto a document by using a projector, capturing a pattern of the light projected onto the document and the document by using a 3D scanning camera, estimating a size of the captured document based on image data of the captured document and estimating a shape of the captured document based on the pattern of the projected light and the captured pattern of the light, and correcting the image data of the captured document based on the estimated size and the estimated shape.

The estimating includes detecting at least one edge of the captured document to estimate the size and a rotation degree of the captured document, and comparing the pattern of the projected light and the captured pattern of the light to estimate the shape of the captured document including bending or a wrinkle of the document. The correcting includes correcting the image data of the captured document based on the estimated information.

The correcting includes correcting the image data of the captured document based on the estimated information so as to change the captured document in a predetermined specific size and a predetermined specific shape.

Furthermore, according to an embodiment of the present disclosure, the method further includes detecting whether a predetermined object is included in the captured document and, when the object is detected, removing the detected object from the captured document. The correcting includes correcting the image data of the captured document, in which the detected object is removed, based on the estimated size and the estimated shape.

The estimating includes estimating illuminance values for each area of the captured document based on the image data of the captured document, the pattern of the projected light and the captured pattern of the light, a material of the captured document, and an angle of the projected light. The correcting includes setting the estimated illuminance values to a predetermined reference illuminance value with respect to each area of the captured document to correct the image data of the captured document.

Advantageous Effects of the Invention

According to various embodiments of the present disclosure, it is possible to capture a pattern, which is projected onto a document to be captured by a 3D scanning camera, and the document, to estimate at least one or more of the size, the rotation degree, the capture angle, the shape, and the Spatially-varying illuminance values of the document based on the captured pattern and the captured document, and to correct image data associated with the captured document based on the estimated information, and thus the document may be easily scanned in 3D.

According to various embodiments of the present disclosure, since it is possible to estimate the size, the rotation degree, the capture angle, or the like of the captured document to scan the document in the predetermined size of the document and in the predetermined form or shape, the document may be easily scanned regardless of a capture distance and a capture direction.

According to various embodiments of the present disclosure, since the correction is possible by using the pattern projected onto the document, even though the document is captured in state where bending, curvature, wrinkle, or the like occurs, the document may be scanned in a state where there is no bending, curvature, wrinkle, or the like; it is possible to easily scan only the document by removing an object such as fingers or tongs from the captured image data even though fingers or tongs are captured with the document.

BEST MODE

Hereinafter, exemplary embodiments of the present disclosure will be described with reference to the accompanying drawings. Hereinafter, limited embodiments are described, but these embodiments are examples of the present disclosure and those skilled in the art may easily modify these embodiments.

The embodiments of the present disclosure disclose that it is possible to capture a pattern, which is projected onto a document to be captured by a 3D scanning camera, and the document, to estimate at least one or more of the size, the rotation degree, the capture angle, the shape, and the illuminance values of the document based on the captured pattern and the captured document, and to correct image data associated with the captured document based on the estimated information, and thus the document may be easily scanned in 3D.

At this time, the embodiments of the present disclosure may easily scan the document regardless of a capture distance and a capture direction, because estimating the size, the rotation degree, the capture angle, or the like of the captured document to scan the document in the predetermined size of the document and in the predetermined form or shape; since the correction is possible by using the pattern projected onto a document even though the document is captured in a state where bending and a wrinkle occur, various embodiments of the present disclosure may scan the document in a state the bending and the wrinkle are not present; various embodiments of the present disclosure may easily scan only the document by removing an object such as fingers or tongs from the captured image data even though fingers or tongs are captured with a document.

At this time, the 3D scanning camera may capture the light of a plurality of patterns projected onto the document (e.g., the structured light of a plurality of patterns projected 18 times per second) by a projector and may also capture the document to be scanned; the device and method according to an embodiment of the present disclosure may scan the captured document in 3D in a specific size and in a specific shape, by comparing the patterns and estimating information about the size, the rotation, or the like of the captured document. In addition, in the present disclosure, the projector may project only one pattern once onto the document, thereby scanning the captured document in 3D in a specific size and a specific shape, by capturing the projected pattern once.

The device and method according to various embodiments of the present disclosure will be described with reference to FIGS. 1 to 7.

Figure 1:
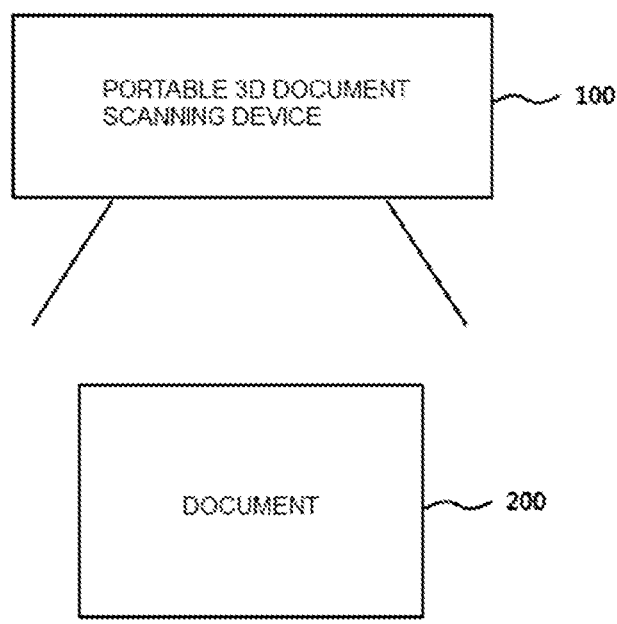
FIG. 1 illustrates an exemplary view for describing a device, according to an embodiment of the present disclosure.
Figure 2:
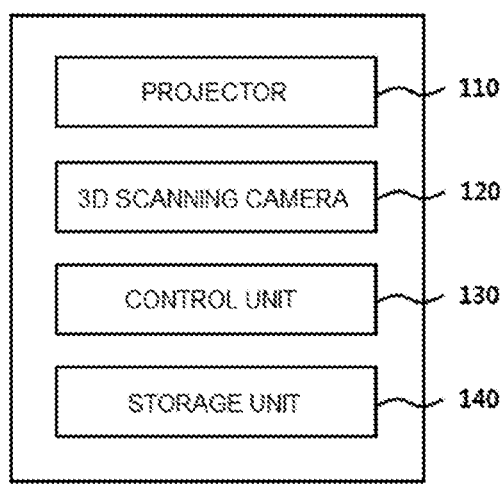
FIG. 2 illustrates a configuration of a portable 3D document scanning device, according to an embodiment of the present disclosure.

FIG. 1 illustrates an exemplary view for describing a device, according to an embodiment of the present disclosure. FIG. 2 illustrates a configuration of a portable 3D document scanning device, according to an embodiment of the present disclosure.

Referring to FIGS. 1 and 2, a portable 3D document scanning device 100 according to an embodiment of the present disclosure may include a projector 110, a 3D scanning camera 120, a control unit 130, and a storage unit 140, as a device scanning a document 200 to be scanned in 3D.

The projector 110 may be a configuration means that projects light of a predetermined pattern for estimating the shape of a document onto the document 200; and the projector 110 may project or irradiate light having a specific shape onto the document under control of the control unit 130.

At this time, the projector 110 may project a plurality of structured lights having predetermined different patterns (e.g., structured lights of eighteen different patterns) onto a document during a specific time period (e.g., one second) under control of the control unit 130, and may project only one structured light with a specific pattern onto a document once. In addition, the pattern and the number of structured lights projected onto the document by the projector 110 may be determined by the provider providing the present disclosure.

Figure 5:
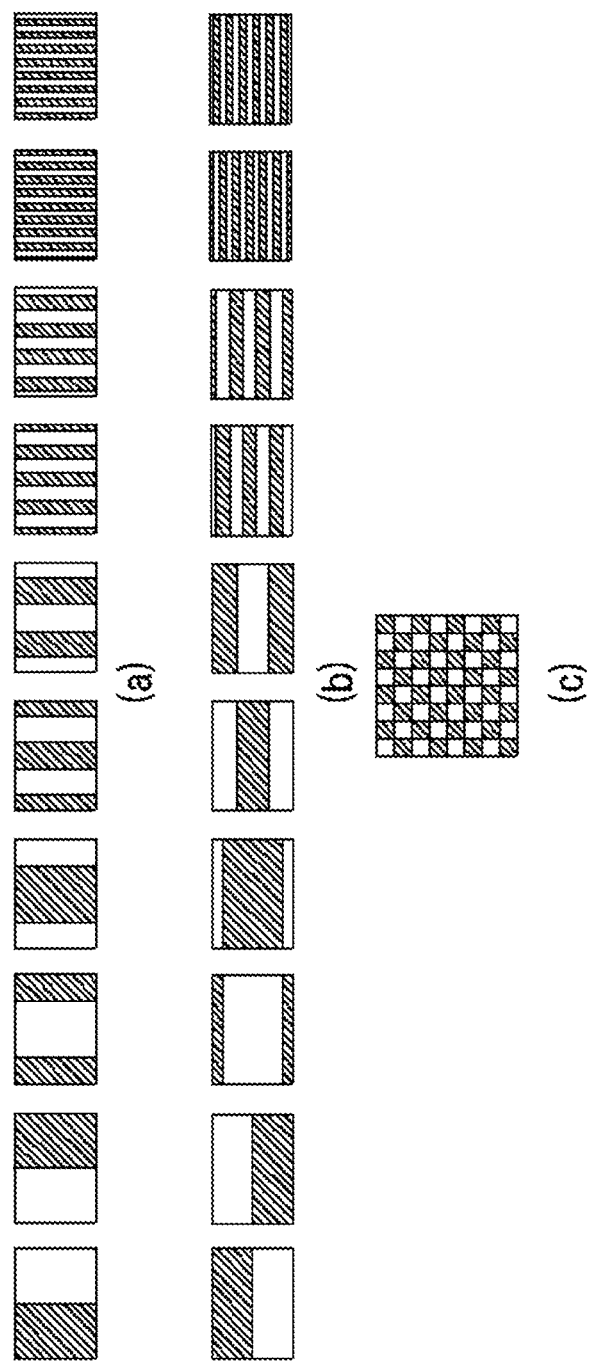
FIG. 5 illustrates an exemplary view for patterns of structured light.

As illustrated in (a) of FIG. 5, the pattern projected onto a document by the projector 110 may have various stripe patterns having different widths in the transverse direction; as illustrated in (b) of FIG. 5, the pattern may have various stripe patterns having different widths in the longitudinal direction; as illustrated in (c) of FIG. 5, the pattern may have a lattice pattern or a checkerboard pattern. Furthermore, the pattern projected by the projector may not be limited to the patterns illustrated in FIG. 5, may include various applicable patterns, such as a cross pattern, an X-pattern, and the like, and only one of the patterns shown in FIG. 5 may be projected onto a document by the projector.

The projection direction of the projector 110 may be the same as the capture direction of the 3D scanning camera, and the direction may be different depending on the situation. Moreover, when the direction is different, the document may be scanned in consideration of the difference.

At this time, the projection time point of the structured light for a plurality of patterns may be determined under control of the control unit 130; in addition, under control of the control unit, the 3D scanning camera may capture a plurality of patterns projected onto a document and may capture the document, in synchronization with the projection time point of the structured light.

The 3D scanning camera 120 may be a configuration means that captures a plurality of patterns projected onto a document and the document to be scanned in 3 dimensions; under control of the control unit 130, the 3D scanning camera 120 may capture each of the plurality of patterns projected onto the document and may capture a document to be scanned in 3 dimensions at another point in time, in synchronization with a point in time when each of a plurality of patterns is projected onto a document.

That is, for the purpose of estimating the bending, curvature, or wrinkle of the document to be scanned in 3D, the 3D scanning camera 120 may capture the plurality of patterns projected onto the document and may capture the document to be scanned, and thus may estimate the size, the rotation degree, the capture angle, or the like of the captured document from the image of the captured document.

The control unit 130 may be a configuration means that controls all the components constituting the device 100 according to an embodiment of the present disclosure; the control unit 130 may estimate the shape of the document associated with the bending degree, the curvature degree, the wrinkle degree, or the like of the document captured based on the shape (e.g., the pattern of the structured light and the pattern of the structured light captured by the 3D scanning camera 120) of light projected by the projector 110; the control unit 130 may detect at least one edge from the captured document to estimate the size and the rotation degree of the document from the captured image, and may correct image data associated with the captured document by using the estimated information.

That is, the control unit 130 may estimate the bending degree, the curvature degree, or the wrinkle degree for each portion of the captured document, by using the pattern of the structured light projected onto the document by the projector 110 and the pattern of the structured light captured by the 3D scanning camera 120 and may detect the at least one edge of the captured document to estimate the size of the captured document and the rotation degree to the right or left, and thus may correct the image data such that the estimated bending or the estimated wrinkle is flat and may correct the image data such that the captured document has the predetermined specific size and the predetermined specific shape.

In the present disclosure, the portion for a process to estimate the shape of a document and a process to detect the at least one edge of the document and to estimate the size of the document and the rotation degree is obvious to those skilled in the art, and thus the description thereof will be omitted.

Moreover, the control unit 130 may detect whether the predetermined object such as an object (e.g., fingers, tongs, or the like) is included, from the captured image; when it is detected that the corresponding object is included, after performing correction of removing the corresponding object from the image data of the captured document, the control unit 130 may correct image data such that the captured document is changed in a predetermined specific size and in a specific shape by using the above-described estimation information; after correcting the image data such that the captured document is changed in the predetermined specific size and in the specific shape by using estimation information, the control unit 130 may perform correction of removing the corresponding object included therein.

Furthermore, the control unit 130 may estimate illuminance values for each area of the captured document based on the material or type of each of the captured document, the captured pattern, and the captured document and the angle of the projected light (or the angle of the light source); the control unit 130 may set the estimated illuminance values to a predetermined reference illuminance value for each area of the captured document to correct the captured document.

Figure 3:
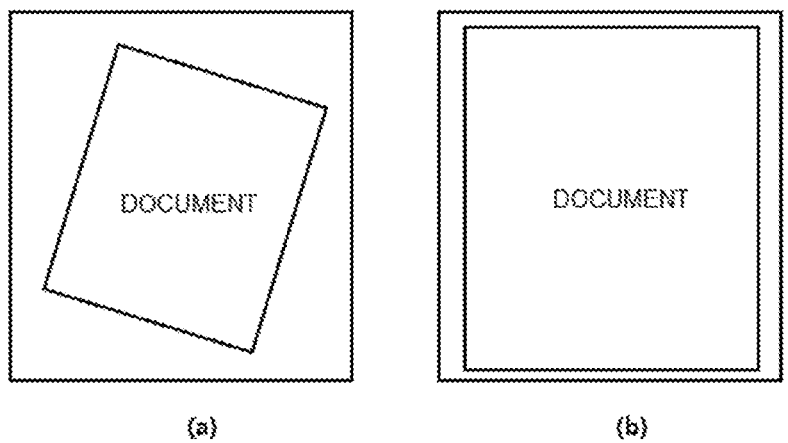
FIG. 3 illustrates an exemplary view for describing an operation of scanning a document in a portable 3D document scanning device.

For example, as illustrated in FIG. 3, when the document captured by the 3D scanning camera 120 is captured vertically and is rotated to the right by a specific angle, the control unit 130 may detect at least one edge of the captured document to estimate the size of the captured document image and the rotation degree to the right, may estimate the bending degree, the curvature degree, and the wrinkle degree of the document through the comparison of the projected pattern and the captured pattern, may rotate the document, which is captured as illustrated in (a) of FIG. 3, in the right direction by the estimated rotation degree based on the estimated information as illustrated in (b) of FIG. 3, may perform correction of enlarging the corresponding document by a specific size and correction according to the estimated bending degree, the estimated curvature degree, and the estimated wrinkle degree, and thus may scan the corresponding document in 3D. In addition, the control unit 130 may perform the correction process to remove the corresponding object in the case where the predetermined object is included in the captured document and the process to correct the estimated illuminance values to the reference illuminance value in the case where the illuminance values are estimated, and thus may correct image data associated with the captured document.

As such, after the control unit 130 performs 3D modeling on the captured document after capturing the pattern and the document by using the 3D scanning camera, the control unit 130 may detect the at least one edge of the captured document to estimate the size of the document, may estimate the rotation degree, the bending, the curvature, the wrinkle, or the like of the document through comparing the image data of the captured document with the pattern to perform direction or rotation correction, shape correction, size correction, shape correction, or the like, and may correct illuminance values through the estimation of the illuminance values. Moreover, the corrected image data may be stored as image data binarized through the binarization process; in the case of a color document, the document corrected in color may be stored.

Figure 4:
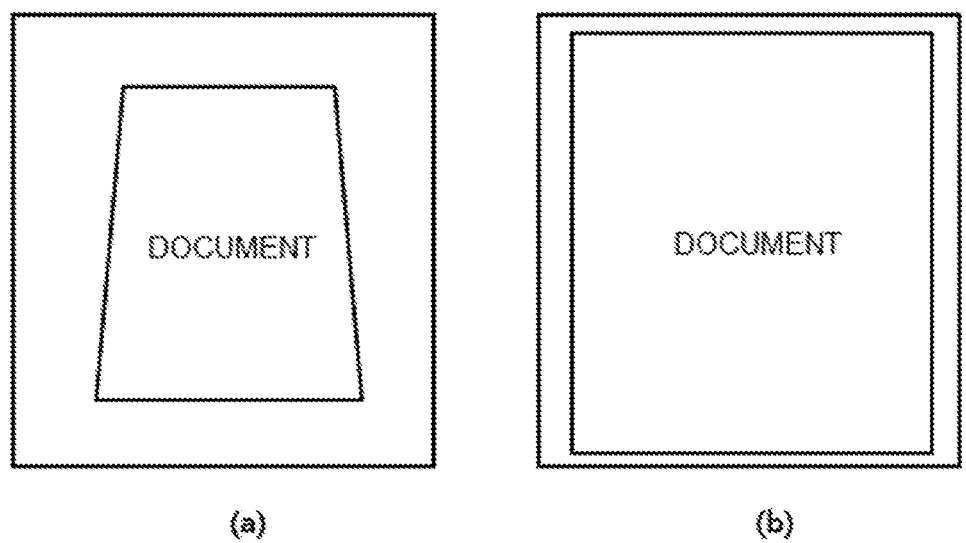
FIG. 4 illustrates another exemplary view for describing an operation of scanning a document in a portable 3D document scanning device.

For another example, as illustrated in FIG. 4, when the document captured by the 3D scanning camera is captured from the bottom of the document to the top of the document without the rotation of the document, the control unit 130 may detect at least one edge of the captured document to estimate the size and the capture angle of the captured document image, may estimate the bending degree, the curvature degree, and the wrinkle degree of the document through the comparison of the projected pattern and the captured pattern, may vertically rotate the document, which is captured as illustrated in (a) of FIG. 4, in consideration of the estimated capture angle based on the estimated information as illustrated in (b) of FIG. 4, may perform correction of enlarging the corresponding document by a specific size and the correction according to the estimated bending degree, the estimated curvature degree, and the estimated wrinkle degree, and thus may scan the corresponding document in 3D. In addition, the control unit 130 may perform the correction process to remove the corresponding object in the case where the predetermined object is included in the captured document and the process to correct the estimated illuminance values to the reference illuminance value in the case where the illuminance values are estimated, and thus may correct image data associated with the captured document.

At this time, the control unit 130 may estimate the capture angle through the length comparison of the top edge of the document and the bottom edge of the document and may correct the captured document to a vertical capture angle based on the estimated capture angle. Also, the method of estimating the capture angle may not be limited thereto and may use all methods capable of estimating the capture angle.

Figure 7:
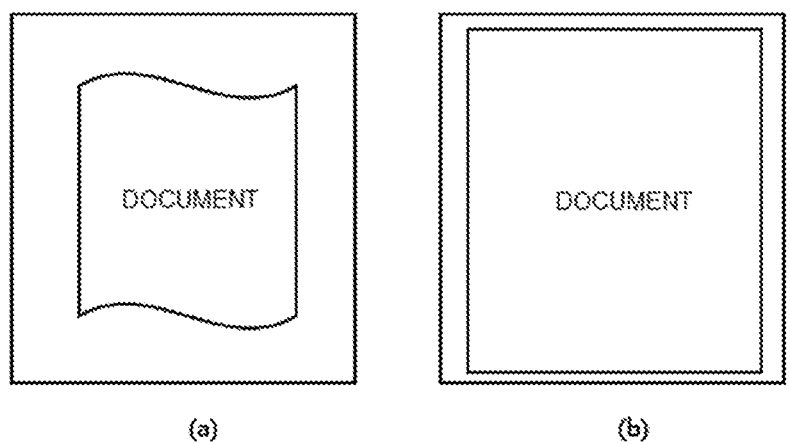
FIG. 7 illustrates another exemplary view for describing an operation of scanning a document in a portable 3D document scanning device.

For another example, as illustrated in FIG. 7, when the document captured by the 3D scanning camera is captured in a state where the document is curved, the control unit 130 may estimate the bending degree, the curvature degree, and the wrinkle degree in each area of the document through the comparison of the projected pattern and the captured pattern, may perform correction according to the estimated bending degree, the estimated curvature degree, the estimated wrinkle degree on the document captured as illustrated in (a) of FIG. 7 based on the estimated information in consideration of the bending degree, the curvature degree, or the like in each area of the captured document as illustrated in (b) of FIG. 7, may perform correction of enlarging the corresponding document by a specific size, and thus may scan the corresponding document in 3D. In addition, the control unit 130 may perform the correction process to remove the corresponding object in the case where the predetermined object is included in the captured document and the process to correct the estimated illuminance values of each area to the reference illuminance value in the case where the illuminance values are estimated with respect to each area, and thus may correct image data associated with the captured document.

In the above-mentioned descriptions, an embodiment is exemplified as estimating illuminance values through a captured document, a pattern comparison, or the like. However, the embodiment is not limited thereto. It is possible to detect the illuminance values of the captured document by including a separate illuminance sensor.

The storage unit 140 may be a configuration means that stores all the data associated with the present disclosure; the storage unit 140 may store image data binarized by the control unit, image data scanned in 3D, data associated with a plurality of patterns, an estimation algorithm, or the like.

As such, the portable 3D document scanning device according to various embodiments of the present disclosure may capture a pattern, which is projected onto a document to be captured by a 3D scanning camera, and the document, may estimate at least one or more of the size, the rotation degree, the shape, and the illuminance values of the document based on the captured pattern and the captured document, and may correct image data associated with the captured document based on the estimated information, and thus may easily scan the document in 3D.

Since the device according to various embodiments of the present disclosure may estimate the size, the rotation degree, the capture angle, or the like of the captured document to scan the document in the predetermined size of the document and in the predetermined form, the device according to various embodiments of the present disclosure may easily scan the document regardless of a capture distance and a capture direction.

Since the correction is possible by using the pattern projected onto the document, even though the document is captured in state where bending, curvature, wrinkle, or the like occurs, the device according to various embodiments of the present disclosure may scan the document in a state where there is no bending, curvature, wrinkle, or the like; the device according to various embodiments of the present disclosure may easily scan only the document by removing an object such as fingers or tongs from the captured image data even though fingers or tongs are captured with the document.

Figure 6:
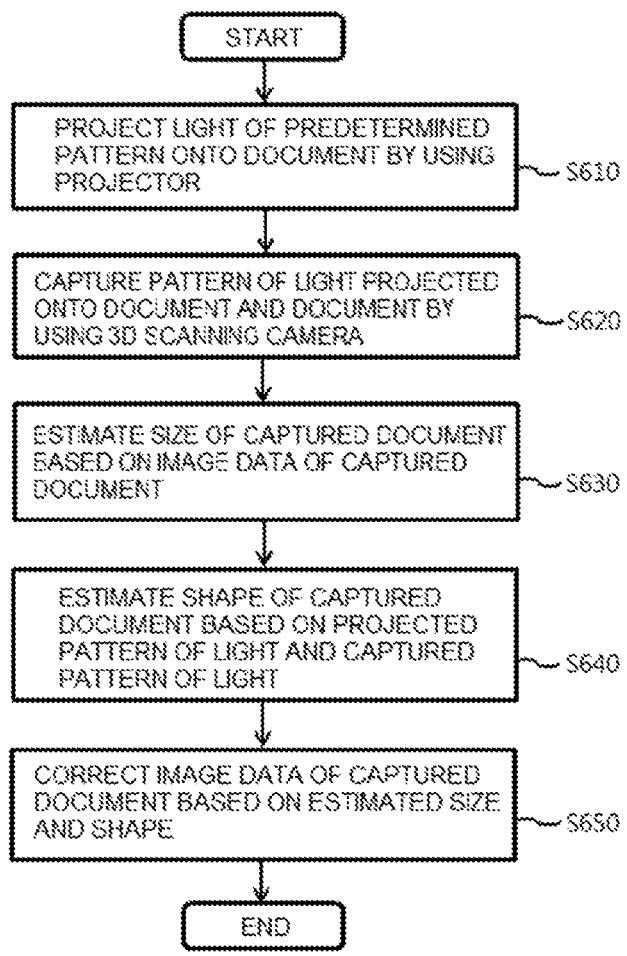
FIG. 6 illustrates an operation flowchart of a portable 3D document scanning method, according to an embodiment of the present disclosure.

FIG. 6 illustrates an operation flowchart associated with a portable 3D document scanning method, according to an embodiment of the present disclosure, and illustrates an operation flowchart in the portable 3D document scanning device described above with reference to FIGS. 1 to 5.

Referring to FIG. 6, in operation S610, a portable 3D document scanning method according to an embodiment of the present disclosure may project light of a predetermined pattern onto a document to be scanned in 3D, by using a projector; in operation S620, the portable 3D document scanning method may capture a pattern of light projected onto the document and the document by using a 3D scanning camera.

Herein, operation S610 may be an operation of sequentially projecting the structured light of a plurality of patterns onto the document by using the projector; operation S620 may be an operation of capturing an image associated with patterns projected onto the document in synchronization with a projection time point of the plurality of patterns.

When the pattern of light projected onto the document and the document are captured in operation S610 and operation S620, in operation S630, the portable 3D document scanning method may estimate at least one of the size, the rotation degree, and the capture angle of the captured document based on the image data of the captured document; in operation S640, the portable 3D document scanning method may estimate the shape of the captured document based on the projected pattern of the light and the captured pattern of the light.

Herein, operation S630 may be an operation of detecting at least one edge from the captured document to estimate the size, the rotation degree, the capture angle, or the like of the document from the captured image; operation S640 may be an operation of estimating the shape of the document of the bending degree, the curvature degree, the wrinkle degree, or the like for each portion of the document, by comparing the pattern projected by the projector with the pattern captured by the 3D scanning camera.

When the size, the rotation degree, the capture angle, the bending degree, the curvature degree, the wrinkle degree, or the like of the captured document is estimated in operation S630 and operation S640, in operation S650, the portable 3D document scanning method may correct image data of the captured document based on the estimated information so as to have a specific size and a specific shape, and thus may scan and store the document in 3D.

In addition, the method according to an embodiment of the present disclosure may detect whether a predetermined object such as fingers, tongs, or the like is present, from the image data of the captured document; when the corresponding object is detected from the captured document, the method may perform a correction process to remove the corresponding object from the image data of the corresponding document; when illuminance values for each area of the document is detected by the image data of the captured document or an illuminance sensor included separately in image capture, the method may correct the detected illuminance values to the predetermined reference illuminance value and thus may correct the image data of the captured document.

Furthermore, the method according to an embodiment of the present disclosure is to scan the document; the method may binarize the scanned document to store the binarized document in black and white in a storage means; when scanning the document in color, the method may scan and store the corrected color document itself.

Moreover, the portable 3D document scanning method according to an embodiment of the present disclosure may include the operations of the portable 3D document scanning device described with reference to FIGS. 1 to 5, and 7.

The above-described system or device may be implemented with hardware elements, software elements, and/or a combination of hardware elements and software elements. For example, the systems, the devices and components described in the exemplary embodiments of the present disclosure may be implemented in one or more General-purpose computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the present disclosure may be recorded in computer-readable media including program instructions to implement various operations embodied by a computer. The computer-readable medium may also include the program instructions, data files, data structures, or a combination thereof. The program instructions recorded in the media may be designed and configured specially for the exemplary embodiments of the present disclosure or be known and available to those skilled in computer software. The computer-readable medium may include hardware devices, which are specially configured to store and execute program instructions, such as magnetic media, optical recording media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like. The described hardware devices may be configured to act as one or more software modules to perform the operations of the above-described exemplary embodiments of the present disclosure, or vice versa.

MODE FOR INVENTION

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

The invention claimed is:
1. A portable 3-dimensional (3D) document scanning device, the device comprising:
a projector configured to project light of a predetermined pattern onto a document;
a 3D scanning camera configured to capture a pattern of the light projected onto the document and image data of the document; and
a control unit, wherein the control unit is configured to:
estimate a size of the captured document based on the image data of the captured document;
estimate a shape of the captured document based on the pattern of the projected light and the captured pattern of the light; and
correct the image data of the captured document based on the estimated size and the estimated shape;
wherein the control unit is configured to:
estimate illuminance values for each area of the captured document based on the image data of the captured document, the pattern of the projected light and the captured pattern of the light, a material of the captured document, and an angle of the projected light; and
set the estimated illuminance values to a predetermined reference illuminance value with respect to each area of the captured document to correct the image data of the captured document.

2. The device of claim 1, wherein the control unit is configured to:
- detect at least one edge of the captured document to estimate the size and a rotation degree of the captured document;
- compare the pattern of the projected light with the captured pattern of the light to estimate the shape of the captured document including bending or a wrinkle of the document; and
- correct the image data of the captured document based on the estimated size, rotation degree, and/or shape of the captured document.

3. The device of claim 2, wherein the control unit is configured to:
- correct the image data of the captured document based on the estimated size, rotation degree, and/or shape of the captured document so as to change the captured document in a predetermined specific size and a predetermined specific shape.

4. The device of claim 1, wherein the control unit is configured to:
- detect whether a predetermined object is included in the captured document; and
- when the object is detected, remove the detected object from the captured document.

5. The device of claim 1, wherein the projector projects a plurality of structured lights having predetermined different patterns onto the document, and
- wherein the 3D scanning camera captures a pattern of each of the plurality of structured lights projected onto the document.

6. A portable 3D document scanning method, the method comprising:
- projecting light of a predetermined pattern onto a document by using a projector;
- capturing a pattern of the light projected onto the document and image data of the document by using a 3D scanning camera;
- estimating a size of the captured document based on the image data of the captured document and estimating a shape of the captured document based on the pattern of the projected light and the captured pattern of the light; and
- correcting the image data of the captured document based on the estimated size and the estimated shape;

wherein the estimating includes:
- estimating illuminance values for each area of the captured document based on the image data of the captured document, the pattern of the projected light and the captured pattern of the light, a material of the captured document, and an angle of the projected light, wherein the correcting includes:
- setting the estimated illuminance values to a predetermined reference illuminance value with respect to each area of the captured document to correct the image data of the captured document.

7. The method of claim 6, wherein the estimating includes:
- detecting at least one edge of the captured document to estimate the size and a rotation degree of the captured document; and
- comparing the pattern of the projected light and the captured pattern of the light to estimate the shape of the captured document including bending or a wrinkle of the document, and wherein the correcting includes:
- correcting the image data of the captured document based on the estimated size, rotation degree, and/or shape of the captured document.

8. The method of claim 7, wherein the correcting includes:
- correcting the image data of the captured document based on the estimated size, rotation degree, and/or shape of the captured document so as to change the captured document in a predetermined specific size and a predetermined specific shape.

9. The method of claim 6, further comprising:
- detecting whether a predetermined object is included in the captured document; and
- when the object is detected, removing the detected object from the captured document, wherein the correcting includes:
- correcting the image data of the captured document, in which the detected object is removed, based on the estimated size and the estimated shape.

* * * * *